United States Patent [19]
Toussant et al.

[11] Patent Number: 5,918,197
[45] Date of Patent: Jun. 29, 1999

[54] MONITOR FOR COLLECTING DATA ON CONSUMER CONSUMPTION OF DISPOSABLE SHEET PRODUCTS

[75] Inventors: John William Toussant, West Chester, Ohio; Robert John Steller, Ft. Thomas, Ky.; Sandi Lin Moore, Cincinnati, Ohio

[73] Assignee: The Procter & Gamble Company, Cincinnati, Ohio

[21] Appl. No.: 08/916,432

[22] Filed: Aug. 21, 1997

[51] Int. Cl.⁶ .............................. G01G 9/00; G01G 13/00; G01G 15/00
[52] U.S. Cl. .......................... 702/101; 705/414; 340/675; 377/8; 221/2; 271/1
[58] Field of Search .................................... 177/2, 3, 4, 5, 177/6, 7, 25.11, 25.13, 245, 25.17; 340/673, 675; 377/6, 8; 221/2; 271/1, 3.14, 278; 33/735, 737; 705/412, 414; 702/101; 364/468.15, 468.22, 469.01; 346/9

[56] References Cited

U.S. PATENT DOCUMENTS

| | | | |
|---|---|---|---|
| 3,058,223 | 10/1962 | Schmidt et al. | 33/129 |
| 3,167,865 | 2/1965 | Steinberg | 33/127 |
| 4,097,726 | 6/1978 | Satoh et al. | 235/92 |
| 4,151,403 | 4/1979 | Woolston | 235/92 |
| 4,335,439 | 6/1982 | St. Denis | 364/562 |
| 4,456,193 | 6/1984 | Westover | 242/75.42 |
| 4,475,163 | 10/1984 | Chandler et al. | 364/562 |
| 4,535,949 | 8/1985 | Olsson | 242/57 |
| 4,570,348 | 2/1986 | Amsler et al. | 33/129 |
| 4,650,464 | 3/1987 | Ruiz et al. | 604/49 |
| 4,674,060 | 6/1987 | Larkin et al. | 364/567 |
| 4,697,278 | 9/1987 | Fleischer | 377/24 |
| 4,704,798 | 11/1987 | Hird | 33/138 |
| 4,721,265 | 1/1988 | Hawkins | 242/55.53 |
| 4,767,922 | 8/1988 | Stauffer | 250/221 |
| 4,817,044 | 3/1989 | Ogren | 364/550 |
| 4,835,698 | 5/1989 | Beery et al. | 364/469 |
| 4,901,237 | 2/1990 | Hikita et al. | 364/464.01 |
| 4,902,965 | 2/1990 | Bodrug et al. | 324/116 |
| 4,922,922 | 5/1990 | Pollock et al. | 128/760 |
| 4,994,722 | 2/1991 | Dolan et al. | 318/480 |
| 5,001,648 | 3/1991 | Baker | 364/484.03 |
| 5,031,258 | 7/1991 | Shaw | 4/623 |
| 5,050,093 | 9/1991 | Reddy et al. | 364/507 |
| 5,127,643 | 7/1992 | DeSanctis et al. | 271/9 |
| 5,153,560 | 10/1992 | Ichikawa | 340/522 |
| 5,155,474 | 10/1992 | Park et al. | 340/691 |
| 5,211,252 | 5/1993 | Henderson et al. | 177/25.14 |
| 5,227,765 | 7/1993 | Ishizuka et al. | 340/568 |
| 5,250,941 | 10/1993 | McGregor et al. | 340/825.65 |
| 5,257,462 | 11/1993 | Buttermann | 33/732 |
| 5,267,703 | 12/1993 | Biagoitti | 242/66 |
| 5,280,274 | 1/1994 | Uemura et al. | 340/675 |
| 5,563,809 | 10/1996 | Williams et al. | 364/560 |
| 5,629,498 | 5/1997 | Pollock et al. | 177/15 |
| 5,691,919 | 11/1997 | Gemmell et al. | 364/550 |
| 5,731,824 | 3/1998 | Kneezel et al. | 347/7 |

FOREIGN PATENT DOCUMENTS

WO 96/03172  2/1996  WIPO .
WO 96/27114  9/1996  WIPO .

*Primary Examiner*—Patrick Assouad
*Attorney, Agent, or Firm*—Vladimir Vitenberg; Larry L. Huston; E. Kelly Linman

[57] ABSTRACT

A monitor for collecting data on consumer consumption of disposable sheet products is disclosed. The monitor comprises a working surface capable of supporting a stack of sheets thereon, a weight sensor, and a recorder. The stack of sheets comprises a plurality of sheets individually removable from the stack. The stack has a stack weight, and each sheet has a sheet weight. The weight sensor is in operative communication with the working surface for measuring the stack weight as the sheets are removed from the stack. The recorder is in communication with the weight sensor for receiving and recording the stack weight. Optionally, the monitor further comprises a consumer input device for receiving data generated by a consumer regarding usage and acceptability of the product being tested. The results of the stack weight measurements and the data generated by a user may be uploaded to a computer to create a data file.

21 Claims, 2 Drawing Sheets

MONITOR FOR COLLECTING DATA ON CONSUMER CONSUMPTION OF DISPOSABLE SHEET PRODUCTS

FIELD OF THE INVENTION

The present invention relates to monitoring dispensing and use of consumable products. Particularly, the present invention relates to monitoring dispensing of consumer-disposable woven and non-woven, including paper, sheet products, including, but not limited to, individual light-weight sheets, such as facial tissues, wipes, paper napkins, sanitary napkins, diapers, and the like, which are normally supplied in a stack. More specifically, the present invention is concerned with an apparatus for collecting data regarding consumer habits related to consumption of such disposable products.

BACKGROUND OF THE INVENTION

Current methods of monitoring consumer habits of consumption of disposable absorbent products comprising individual light-weight sheets which are normally supplied in stacks, such as facial tissues, wipes, napkins, and the like, traditionally rely on research questionnaires and handwritten diary-type studies. The typical questions in such questionnaires pertain to the detailed information regarding consumption of the product and other data related to consumer consumption patterns. Traditional methods of collecting such information are time consuming and burdensome for both a manufacturer of the product and a consumer. Moreover, the traditional methods of collecting the data pertaining to patterns of consumption and usage of consumer-disposable products, such as individual light weight paper sheets, may result in unnatural habit changes during a test period. Furthermore, the use of the traditional diary-type studies has a significant potential for a human error regarding details of dispensing such as, for example, time of the dispensing, amount/dosage of the product being dispensed and so on. Therefore, the limits of accuracy and consistency of the data collected by the traditional means affect the reliability of the interpretation of the collected data.

What is needed is a novel way of obtaining, in a manner non-burdensome for a consumer, accurate information regarding patterns of the consumer consumption of disposable sheet products. Accordingly, it is an object of the present invention to provide a monitor for collecting data regarding patterns of consumer consumption of disposable sheet products.

It is another object of the present invention to provide a process of collecting data regarding consumer consumption of disposable sheet products.

SUMMARY OF THE INVENTION

A monitor for collecting data on consumer consumption of disposable sheet products comprises a working surface, a weight sensor, a recorder, and preferably a real-time clock. The working surface is capable of supporting a stack of individual sheets. The stack has a stack weight, and an individual sheet has a sheet weight. When the stack is supported by the working surface, a consumer can remove the individual sheets from the stack, thereby decreasing the stack weight. An act of removing one or more sheets from the stack, whereby a new (changed) stack weight is measured and recorded by the monitor, is defined herein specifically as a "weight-changing event," or generically as an "event."

The weight sensor is in operative communication with the working surface such as to measure an absolute value of the stack weight. The preferred weight sensor is a load cell. The weight sensor has resolution of at least about 40% of the sheet weight. Preferably, the weight sensor has resolution of at least about 20% of the sheet weight, and more preferably, the weight sensor has resolution of at least about 5% of the sheet weight.

A weight threshold indicates the minimal change in the stack weight, which minimal change causes the monitor to record the weight-changing event. The weight threshold is preferably set up to be about 50% of the sheet weight. Preferably, the weight sensor has resolution which is at least about two times higher than the weight threshold. More preferably, the weight sensor has resolution which is at least about four times higher than the weight threshold.

The recorder is in communication with the weight sensor for receiving and recording information regarding changes in the stack weight. The monitor is preferably capable of adjusting its current weight baseline such as to accommodate changes in the stack weight which are not associated with removal of the sheets from the stack and which are less than the weight threshold. The term "current weight baseline" refers to a current absolute value of the stack weight with which the next subsequent absolute value of the stack weight will be compared after a consumer removes one or more individual sheet(s) from the stack. For analysis purposes, the stack weight is detected and measured in digital "counts." One count corresponds to a fraction of the sheet weight.

Optionally, the monitor of the present invention has a consumer input device which allows a consumer to enter specific information regarding usage and acceptability of the product being tested. The consumer input device may comprise a switch or series of switches, such as, for example, push buttons, each button corresponding to an answer to a specific question. Alternatively or additionally, the consumer input device may comprise a voice recorder. An act of a consumer entering information using the consumer input device is defined herein specifically as an "input event," or generically as an "event." Every input event is detected and recorded by the monitor, regardless of occurrence or non-occurrence of the weight-changing event.

The real time clock provides the information regarding a date and a time of the event. Event records pertaining to both types of events, the weight-changing events and the input events, may be uploaded from the recorder through an interface to a computer, in order to create a data file. The data file can be transformed into a spreadsheet.

In its process aspect, the present invention comprises the steps of:

(a) providing a stack of sheets, the stack having a stack weight and comprising a plurality of individual sheets, each sheet having a sheet weight, the sheets being individually removable from the stack;

(b) providing a monitor comprising a working surface capable of supporting the stack of sheets, a weight sensor in operative communication with the working surface for measuring the stack weight as the sheets are removed from the stack, and a recorder in communication with the weight sensor for receiving and recording the stack weight;

(c) installing the stack of sheets such that the stack is supported by the working surface; and (d) dispensing the sheets from the stack thereby changing the stack weight and causing the monitor to measure and record the stack weight.

DETAILED DESCRIPTION OF THE INVENTION

Figure 1:
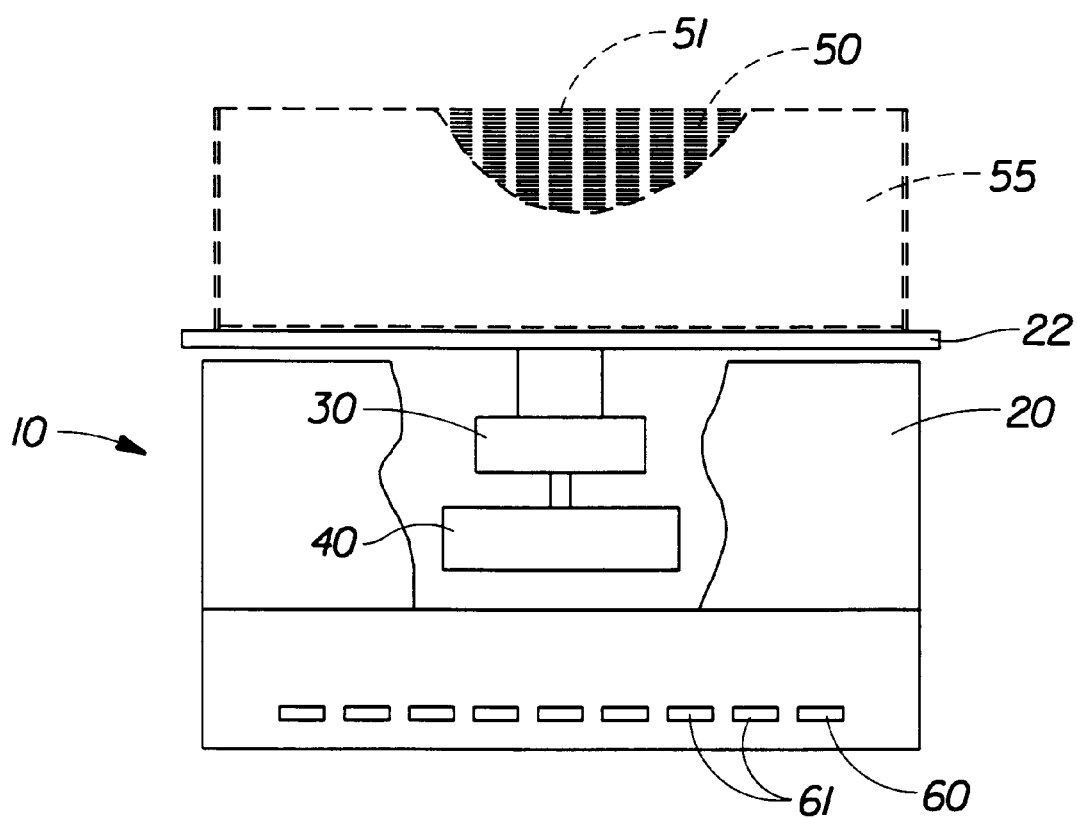
FIG. 1 is a schematic frontal view of one embodiment of the monitor of the present invention shown partially in cutaway.

As shown in FIG. 1, the monitor 10 of the present invention comprises three primary elements: a working surface 22, a weight sensor 30, and a recorder 40. The working surface 22 is capable of supporting, and preferably retaining, a tested dispensable consumer product, specifically—a stack 50 comprised of individual sheets 51. Preferably, the stack 50 is disposed on the working surface 22.

Preferably, the monitor 10 comprises a housing 20. Then, the working surface 22 is preferably located on the top of the housing 20, as shown in FIG. 1. If the monitor 10 comprises the housing 20, the housing 20 is preferably comprised of a case having a shape which allows one to place a disposable consumer product such that the product is supported by the working surface 22. It should be pointed out that the working surface 22 does not need to comprise a planar, or flat, surface. The nature, characteristics and the task of the stack 50 may require the use of the supporting member 22 having a specific non-planar configuration. Therefore, it should be understood that, as used herein, the term "working surface 22" designates any element capable of supporting the stack 50, whether or not the stack 50 is physically disposed onto the working surface 22. It would be apparent to one skilled in the art that the supporting member 22 can have a variety of shapes and orientations which are all included in the scope of the present invention. In FIG. 1, the working surface 22 comprises a substantially horizontal area.

As an example, in the embodiment shown in FIG. 1, the housing 20 comprises a generally rectangular plastic case. It should be understood, however, that the housing 20 may have other shapes and comprise other materials. Preferably, the working surface 22 is vertically movable relative to the housing 20. As used herein, the terms "vertical" or "vertically" refer to the direction essentially perpendicular to the working surface 22. When the monitor 10 is in a working position, the vertical direction is preferably coincidental with the direction of the gravitation.

Typically, the stack 50 of the sheets 51 is contained in a carton container, or box, 55, such as, for example, a box of facial tissues PUFFS® produced and sold by the present assignee. However, as used herein, the term "stack 50 of sheets 51," or simply "stack 50," designates any plurality of disposable paper or non-paper products, such as a stack of facial tissues, wipes, napkins, paper towels, and the like, whether or not such plurality is packaged in the box 55. For example, paper napkins which are included in the scope of present invention, are typically sold to consumers in a transparent and flexible wrapper.

It also should be understood that each of the sheets 51 comprising the stack 50 may be individually wrapped in a wrapper and individually dispensable as such. Alternatively, two or more sheets 51 in the stack 50 may be wrapped in a wrapper. In the latter case, the stack 50 may comprise a plurality of mini-packages (not shown), each mini-package comprising two or more sheets 51 wrapped in the wrapper, each mini-package being individually dispensable.

It is an important feature of the present invention that the monitor 10 allows one to conduct consumer consumption tests without altering original packaging of the tested products or otherwise unduly interfering with normal and customary ways of their dispensing. In accordance with the present invention, a tested product in its original packaging can be used, and there is no need to re-package the tested product or perform other additional steps for the testing purposes. All that is needed in most cases is to place the tested product in the original packaging on the working surface 22 of the monitor 10. The monitor 10 is a comparatively small apparatus which can easily fit in virtually any place where consumers customarily keep the types of the tested products described hereinabove. The monitor 10 of the present invention, therefore, does not significantly alter consumers' habits related to dispensing and usage of the tested products and thus provides reliable information in this regard.

As used herein, a weight of the stack 50 is defined as a "stack weight," and a weight of the individual sheet 51 is defined as a "sheet weight." It should be appreciated that because of the possible deviations in size, density, and other parameters of the individual sheets 51 and/or box 55, the terms "stack weight" and "sheet weight" designate an average (statistical) product weight.

The weight sensor 30 measures an absolute value of the stack weight. As one skilled in the art will readily appreciate, there is a variety of devices that can be used as the weight sensor 30 for the monitor 10 of the present invention. The examples of the weight sensor 30 include, but are not limited to, piezoelectric and piezoresistive (semiconductor) sensors, strain gauge sensors, capacitance sensors, inductive sensors, reluctance sensors, magnetostrictive sensors, and other weight-measuring devices well known in the art. The preferred weight sensor 30 of the present invention is an electronic load cell. The load cell is generally a device that converts a force applied to it into a proportional electrical signal. This electrical signal can be measured by a recorder, and based on the measurement of the electrical signal the amount of the force applied to the load cell can be determined and recorded. Electronic load cells are described in H. A. Mills et al., *Process, Measurement and Analysis* (*Instrument Engineers' Handbook*), Chilton Book Company, 3d Edition, 1995, which book is incorporated by reference herein for the purpose of describing load cells. In the preferred embodiment of the present invention, the load cell converts the force created by the stack weight into an electrical signal.

When the stack 50 is disposed on the working surface 22, a consumer can remove individual sheets 51 from the stack 50, thereby changing (decreasing) the stack weight. A consumer may remove one or several sheet(s) 51 at a time, thereby changing the stack weight by the weight of the sheet(s) 51 being removed.

The weight sensor 30 is in operative communication with the working surface 22 supporting the stack 50. The weight sensor is also in communication with the recorder 40. Thus, when the stack 50 changes its weight—due to removal of one or more sheet(s) 51, or for other reasons—the monitor 10 (through the weight sensor 30 and the recorder 40) is capable of measuring and recording an absolute value of the new (changed) stack weight of the stack 50. As used herein, an act of removing one or more sheet(s) 51 from the stack 50, whereby the monitor 10 measures and records a new (changed) stack weight of the stack 50 is defined as a "weight-changing event." Of course, it should be understood that the change in the stack weight must be at least equal to or preferably greater than the level of sensitivity, or resolution, of the weight sensor 30, for the weight sensor 30 to be able to detect the new (changed) stack weight, as will be explained in greater detail below.

When a consumer removes one or more sheet(s) 51 from the stack 50, the stack weight changes by the weight of the removed sheet or sheets 51. The new, or changed, stack weight, after one or more sheet(s) 51 has (have) been removed from the stack 50, establishes a new current weight baseline. As used herein, the term "current weight baseline" refers to a current absolute value of the stack weight with which the next subsequent absolute value of the stack weight will be compared to establish a stack weight decrement, after one or more individual sheet(s) 51 has (have) been removed from the stack 50, i.e., after the weight-changing event has occurred. This "new" subsequent stack weight becomes a "new" current weight baseline, and so on, until the last sheet 51 is removed and the stack 50 ceases to exist.

In selecting components for the monitor 10 of the present invention, it is important that the weight sensor 30 has resolution of at least about 40% of the sheet weight. As used herein, the term "resolution" of the weight sensor 30 defines sensitivity of the weight sensor 30 and indicates a minimal change in the stack weight, which minimal change causes the weight sensor 30 to detect and measure a new (changed) stack weight after removal of one or more sheet(s) 51 from the stack 50. One skilled in the art will readily understand that the smaller the numerical percentage of the resolution relative to the sheet weight, the higher the resolution of the weight sensor 30. For example, the resolution of 5% of the weight sheet is higher than the resolution of 10% of the sheet weight.

Preferably, the weight sensor 30 of the monitor 10 of the present invention has resolution of at least about 20% of the sheet weight. More preferably, the weight sensor 30 of the monitor 10 of the present invention has resolution of at least about 5% of the sheet weight. For example, if the individual sheet 51 has the sheet weight 1.0 gram, then the preferred weight sensor 30 has resolution at least about 0.2 gram, and the more preferred weight sensor 30 has resolution at least about 0.05 gram.

As used herein, the term "weight threshold" indicates a minimal change in the stack weight, which minimal change causes the monitor 10 to register the weight-changing event. The weight threshold should not be confused with the resolution. Obviously, the resolution should be higher than the weight threshold. Preferably, the resolution is at least about two times higher than the weight threshold. More preferably, the resolution is at least about four times higher than the weight threshold. For example, if the desired weight threshold is at least about 0.4 gram, then the monitor 10 should preferably comprise the weight sensor 30 having the resolution of at least about 0.2 gram, and more preferably the weight sensor 30 having the resolution of at least about 0.1 gram. One skilled in the art will appreciate that based on the desired resolution of the monitor 10, the weight threshold can be set up to a certain value equal N times resolution, where "N" is an integer. The preferred weight threshold is about 50% of the sheet weight. It should be kept in mind that, as has been explained above, the sheet weight is the average weight of the individual sheet 51. Thus, for a given product being tested, the weight threshold should be set up such as to take into account the tested product's average sheet weight and the standard (statistical) weight deviation, both of which may considerably differ from product to product. Therefore, the appropriate load cell 30 should be chosen depending on the nature and the stack weight of the stack 50. For example, a "heavy-duty" monitor 10 suitable for testing consumption of a relatively heavy sheet products may utilize the load cell 30 of a type different from a type of the load cell 30 utilized in a "light-duty" monitor 10 suitable for testing consumption of a relatively light sheet products.

One skilled in the art will appreciate that during the time between two consecutive events, the current weight baseline may fluctuate due to changes in the environment, primarily temperature and humidity. Such occurrences as vibration of the floor in a room where the monitor 10 is located, and the like occurrences, may also affect the current weight baseline. Therefore, the monitor 10 should preferably be capable of adjusting the current weight baseline such as to take into account any changes in the stack weight, which changes are less than the weight threshold. In other words, the monitor 10 should preferably be capable of adjusting the current baseline to compensate for changes in the stack weight, which changes are not associated with removal of the sheet(s) 51 from the stack 50, for example, the changes in the stack weight due to changes in the environmental conditions.

One skilled in the art will know how to cause the monitor 10 to automatically adjust the current weight baseline in the foregoing situations. At least one way of accomplishing such an adjustment of the current weight baseline is to have the recorder 40 read the absolute value of the stack weight at certain time intervals, for example, every 3 seconds. If the recorder 40 detects a change in the stack weight which change is less than the weight threshold, the adjustment of the current weight baseline is preferably performed to adjust the current weight baseline to the new (changed) stack weight without recording the change in the stack weight. Of course, a minimal weight by which the current weight baseline can be adjusted is dictated by the level of sensitivity of the weight sensor 30, i.e., its resolution.

As has been pointed out hereinabove, consumer habits relating to dispensing the disposable products may vary significantly among consumers and depending upon the nature and the task of a particular tested product. For example, in one case scenario, some consumers may prefer to remove one or several individual sheets 51 from the stack 50 without removing the entire stack 50 from the working surface 22 of the monitor 10. In another case scenario, some consumers may find it more convenient to—first, remove the entire stack 50 (including a container if applicable) from the working surface 22, —second, remove a desired number of the sheets 51 from the stack 50, and—third, install the stack 50 back onto the working surface 22. In the latter case scenario, the absolute value of the stack weight read by the recorder 40 should suddenly drop to zero during a period of time when the entire stack 50 is removed from the working surface 22. This sudden drop to zero may be reflected in event records, as explained herein below, and may be taken into account while analyzing the event records. Alternatively, the monitor 10 may be capable of accommodating such sudden changes in the stack weight read by the recorder 40, without these sudden changes being recorded in the event records.

Figure 2:
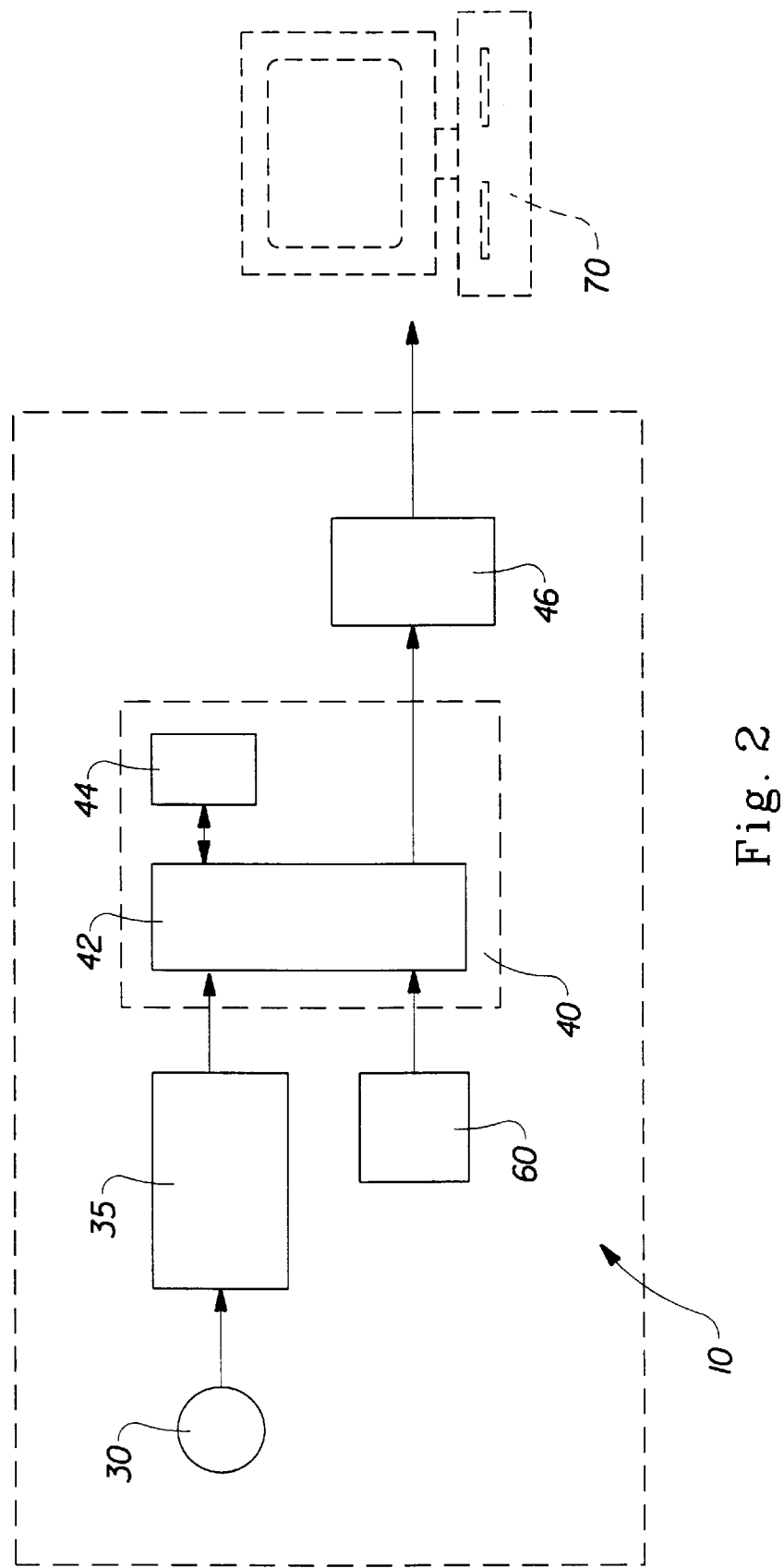
FIG. 2 is a block diagram of the embodiment of the monitor shown in FIG. 1.

In the embodiment of the monitor 10 of the present invention schematically shown in FIG. 2, the recorder 40 comprises a microprocessor 42 in communication with a memory 44 and a real time clock (not shown). The memory 44 is preferably nonvolatile memory so that in the case of power failure the data collected in the memory 44 would not be lost. The memory 44 having capacity of storing up to 2000 events has been found to perform satisfactory. In FIG.

2, the microprocessor 42 receives the information regarding changes in the stack weight (i.e., "new," or changed, values of the stack weight as the sheets 51 (not shown in FIG. 2) are removed from the stack 50 (not shown in FIG. 2) from the weight sensor 30 through an analog to a digital converter 35.

For analysis purposes, the stack weight is preferably measured in digital "counts." The analog to a digital converter 35 schematically shown in FIG. 2 is used to convert electrical signals produced by the weight sensor 30 comprising the load cell into digital counts that can be read by the recorder 40. Preferably, at least one digital count corresponds to the resolution of the weight sensor 30. Of course, the weight sensor 30 should be chosen or adjusted such as to be capable of measuring the total stack weight. For example, the load cell Model FT 50 Force Transducer commercially available from the manufacturer Revere Transducers, 14030 Bolsa Lane, Cerritos, Calif. 90701-5195, was set up to have 2048 counts over the 500 gram range to successfully test consumers' habits regarding consumption of the facial tissue PUFFS®, the average weight of the individual PUFFS® tissue sheet (sheet weight) being about 1.5 gram which corresponds to 6 counts.

Preferably, the monitor 10 of the present invention has a consumer input device 60, as shown in FIGS. 1 and 2. The consumer input device 60 is a consumer-activated device which allows the consumer to enter specific information regarding usage and acceptability of the product being tested. The consumer input device 60 may comprise a switch or series of switches, such as, for example, push-buttons 61 schematically shown in FIG. 1. Each push-button 61 corresponds to a certain question which a consumer can answer by pushing the push-button(s) 61. Alteratively or additionally, the consumer input device 60 may comprise a voice recorder (not shown) allowing a consumer to verbally address the issues related to use and acceptability of the tested product. Other communicative devices known in the art and suitable for the purposes of the present invention may also be utilized in the monitor 10.

An act of a consumer entering information using the consumer input device 60 is defined herein as an "input event." Both types of the events, the "weight changing event" and the "input event," are generically defined herein as an "event." The input event is detected and recorded by the monitor 10, whether or not any change in the stack weight (i.e., weight-changing event) has occurred at or about the time of the input event.

The real time clock (not shown) provides the recorder 40 with the information regarding the date and the time of the event, whether it is the weight-changing event or the input event. Each event has a separate event record. Each event record may be uploaded from the recorder 40 through an interface 46 to a computer 70, in order to create a data file. The interface 46 connects the monitor 10 of the present invention to the computer 70. The standard RS-232C serial link has proven to perform satisfactory as the interface 46. The data file can be transformed into a spreadsheet, as one skilled in the art will easily understand.

The following TABLE represents an exemplary spreadsheet developed in conjunction with the testing of the PUFFS® facial tissue using the monitor 10 of the present invention.

TABLE

| (1) Data Records from monitor | (2) Date | (3) Time | (4) Absolute Count | (5) Delta Count | (6) Switch | Event Analysis |
|---|---|---|---|---|---|---|
| 96/07/15, 15:46:56, 077D, EE, 00 | 07/15/96 | 15:46:58 | 1917 | −18 | 0 | dispense 3 |
| 96/07/15, 15:47:17, 077D, 00, 03 | 07/15/96 | 15:47:17 | 1917 | 0 | 3 | switch 3 |
| 96/07/15, 15:47:26, 0777, FA, 00 | 07/15/96 | 15:47:26 | 1911 | −6 | 0 | dispense 1 |
| 96/07/15, 15:47:39, 0777, 00, 01 | 07/15/96 | 15:47:39 | 1911 | 0 | 1 | switch 1 |
| 96/07/15, 15:47:52, 076B, F4, 00 | 07/15/96 | 15:47:52 | 1899 | −12 | 0 | dispense 2 |
| 96/07/15, 15:48:24, 0765, FA, 00 | 07/15/96 | 15:48:24 | 1893 | −6 | 0 | dispense 1 |
| 96/07/15, 15:48:41, 075F, FA, 00 | 07/15/96 | 15:48:41 | 1887 | −6 | 0 | dispense 1 |
| 96/07/15, 15:49:02, 075F, 00, 02 | 07/15/96 | 15:49:02 | 1887 | 0 | 2 | switch 2 |

As the TABLE shows, each line in the column (1) represents an event record of the data collected from the monitor 10 for each event, whether it is the weight-changing event or the input event. Some of the data in the column (1) is recorded in hexadecimal symbols, such for example as: "077D," and "EE" (see the first line in the column (1) of the TABLE). Columns (2)–(6) represent the data from the first column broken down by categories and transcribed in decimal symbols. For example, the first event record in the TABLE contains the following data regarding the event:

(2) Date: Jan. 15, 1996. "Date" is the date of the event.
(3) Time: 15:46:56. "Time" is the time of the event.
(4) Absolute Count: 1917 (corresponding to hexadecimal 077D in the column (1)). "Absolute Count" is the number of digital "counts" representing the stack weight, as explained above; it should not be confused with the actual number of the paper sheets or their absolute weight.
(5) Delta Count: −18 (corresponding to hexadecimal EE in the column (1)). "Delta Count" is the change in the stack weight represented in digital "counts"; the sign "−" indicates weight decrement.
(6) Switch: 0 (corresponding to hexadecimal 00 in the column (1)). "Switch" represents occurrence or non-occurrence of the consumer input device entry, i.e., type of the event recorded. Zero ("0") indicates that it was the weight-changing event. A numeric symbol other than "0" indicates that it was the input event. In the TABLE, the numeric symbols "3" in line 2 (second event record), "1" in line 5 (fifth event record), and "2" in the last line (last event record) represent specific push-buttons of the monitor 10 being used. If both the weight-changing event and the input event are related to the same act of dispensing, separate event records are preferably recorded: one— reflecting the change of the stack weight (weight-changing event record), and the other—reflecting the consumer's input information (input event record). These separate records then are grouped together based on the date and the time, for the analysis purposes.
(7) Event Analysis: dispense 3. "Dispense 3" indicates that a consumer removed three sheets from the stack.

The monitor 10 of the present invention may be successfully utilized for consumer test purposes with regard to consumable products portions of which are typically removable by a consumer during the use of these products. Such products include, but are not limited to, tooth paste, dishwashing soap, bath soap, detergent, deodorant, coffee, sugar, and other consumer products. The consumption of these products may be determined based on measuring and recording these products' weight decrements during their use.

In this regard, it should be appreciated that the tested product can be supported by the working surface 22 without being directly disposed thereon. A suitable product, such as a roll of toilet paper, for example, may be suspended from the working surface 22. This arrangement can be easily appreciated by one skilled in the art and therefore is not illustrated herein.

As has been pointed out above, one of the major advantages of the present invention is that the monitor 10 does not significantly alter consumers' habits related to dispensing and usage of the tested products. Therefore, the monitor 10 should preferably be a self-contained apparatus, independent of external source of electrical power. Preferably, the monitor 10 of the present invention comprises a source of electrical power which lasts long enough to supply the energy during an average life of the average stack 50. Preferably, the monitor 10 comprises at least one electrical battery as a source of electrical power. The embodiment of the monitor 10 schematically shown in FIGS. 1 and 2 has successfully utilized six 1.5-Volt, D-cell, Alkaline "Long Life" electrical batteries (not shown). These six batteries in the monitor 10 lasted for the period of up to about two months, which period was found satisfactory for testing of the PUFFS® facial tissue. Alternatively, the apparatus 10 of the present invention can be operated by utilizing a 110 Voltage system or other household power systems commonly available around the world.

What is claimed is:

1. A monitor for collecting data on consumer consumption of disposable sheet products, said monitor having a current weight baseline and comprising:

a working surface capable of supporting a stack of sheets, said stack of sheets having a stack weight and comprising a plurality of individual sheets, each sheet having a sheet weight, said sheets being individually removable from said stack;

a weight sensor in operative communication with said working surface for measuring said stack weight of said stack of sheets as said sheets are removed therefrom, and a recorder in communication with said weight sensor for receiving and recording said stack weight, said monitor being capable of adjusting said current weight baseline to compensate changes in said stack weight which changes are not associated with removal of said sheets from said stack.

2. The monitor according to claim 1, wherein said recorder is capable of detecting changes in said stack weight, which changes are not associated with removal of said sheets from said stack.

3. The monitor according to claim 2, wherein said recorder is capable of detecting changes in said stack weight, which changes are caused by environmental conditions.

4. The monitor according to claim 1, wherein said weight sensor has resolution of at least about 40% of said sheet weight.

5. The monitor according to claim 4, wherein said weight sensor has resolution of at least about 20% of said sheet weight.

6. The monitor according to claim 5, wherein said weight sensor has resolution of at least about 5% of said sheet weight.

7. The monitor according to claim 1, further comprising an analog to a digital converter in communication with said weight sensor and said recorder.

8. The monitor according to claim 1, wherein said weight sensor comprises a load cell.

9. The monitor according to claim 8, wherein said recorder comprises a microprocessor in communication with a memory.

10. The monitor according to claim 1, further comprising a consumer input device for receiving data entered by a consumer.

11. The monitor according to claim 10, wherein said consumer input device comprises at least one switch controllable by the consumer.

12. The monitor according to claim 10, wherein said consumer input device comprises a voice recorder.

13. The monitor according to claim 1, further comprising a source of electric power.

14. The monitor according to claim 13, wherein said source of electric power comprises at least one electric battery.

15. A monitor for collecting data on consumer consumption of disposable sheet products, which monitor comprises:

a working surface capable of retaining a stack of sheets thereon, said stack of sheets having a stack weight, said sheets being individually removable from said stack;

a weight sensor in operative communication with said working surface for measuring an absolute value of said stack weight as said sheets are removed from said stack of sheets;

a recorder in communication with said weight sensor for receiving and recording said absolute value of said stack weight as said sheets are removed from said stack of sheets;

a consumer input device for receiving data generated by a consumer; and a real-time clock for establishing a real time when said sheets are removed from said stack or said consumer input device is initiated.

16. A process of collecting data on consumer consumption of disposable sheet products, which process comprises:

(a) providing a stack of sheets, said stack comprising a plurality of sheets and having a stack weight, said sheets being individually removable from said stack, each sheet having a sheet weight:

(b) providing a monitor comprising
   a working surface capable of supporting said stack of sheets,
   a weight sensor in operative communication with said working surface for measuring said stack weight of said stack of sheets as said sheets are removed therefrom: and
   a recorder in communication with said weight sensor for receiving and recording said stack weight.
   said monitor having a current weight baseline and being capable of adjusting said current weight baseline to compensate changes in said stack weight, which changes are not associated with removal of said sheets from said stack;

(c) installing said stack of sheets such that said stack is supported by said working surface of said monitor: and (d) dispensing said sheets from said stack thereby changing said stack weight and causing said monitor to detect and record said stack weight.

17. The process according to claim 16, wherein said recorder is capable of detecting changes in said stack weight, which changes are caused by environmental conditions.

18. The process according to claim 17, wherein said weight sensor has resolution of at least about 40% of said sheet weight.

19. The process according to claim 18, wherein said monitor further comprises a source of electric power.

20. The process according to claim 16, wherein said monitor further comprises a consumer input device for receiving data generated by a consumer.

21. The monitor according to claim 1, wherein said working surface comprises a substantially horizontal area.

* * * * *